Figure 1:
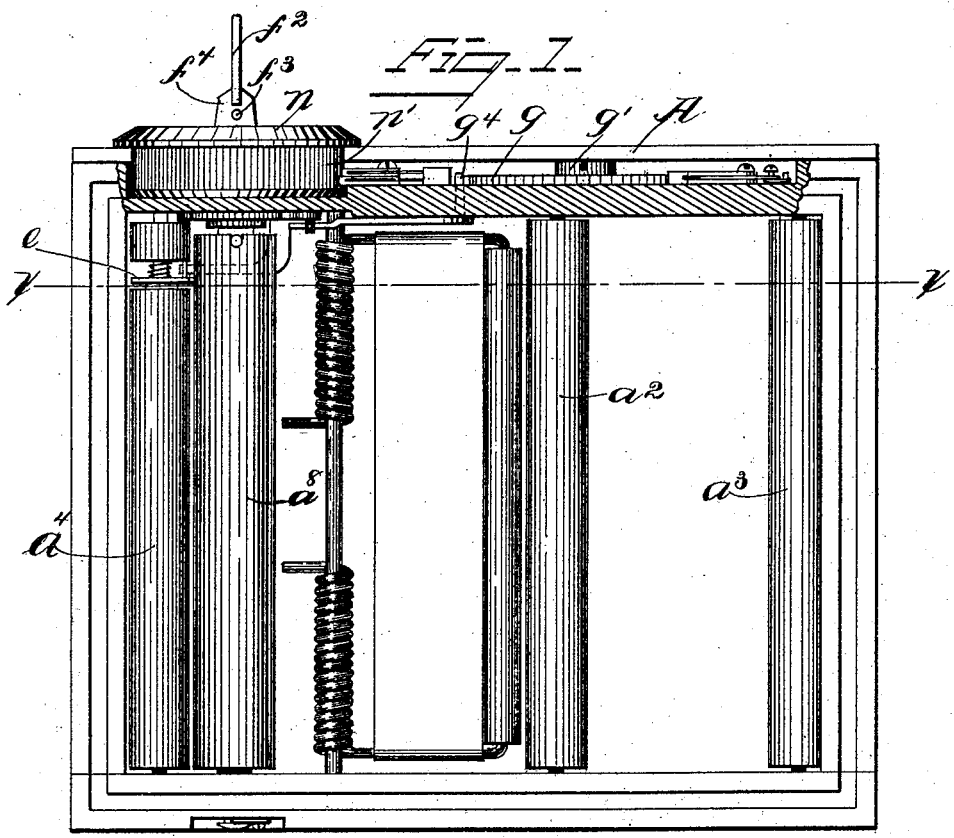

(No Model.) 2 Sheets—Sheet 1.

N. CRANE.
PHOTOGRAPHIC ROLL HOLDER.

No. 549,231. Patented Nov. 5, 1895.

WITNESSES. Fig. 9. INVENTOR.

(No Model.) 2 Sheets—Sheet 2.
N. CRANE.
PHOTOGRAPHIC ROLL HOLDER.
No. 549,231. Patented Nov. 5, 1895.
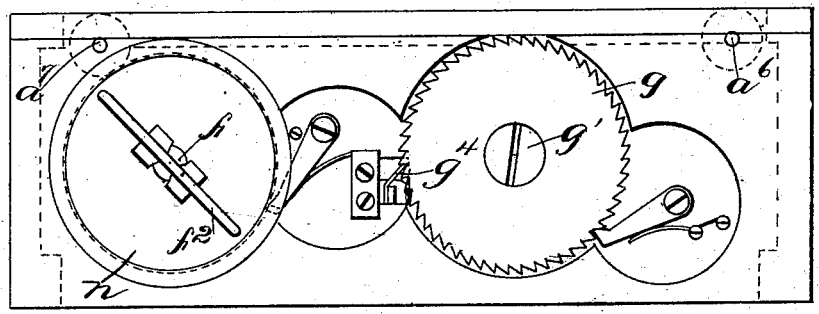
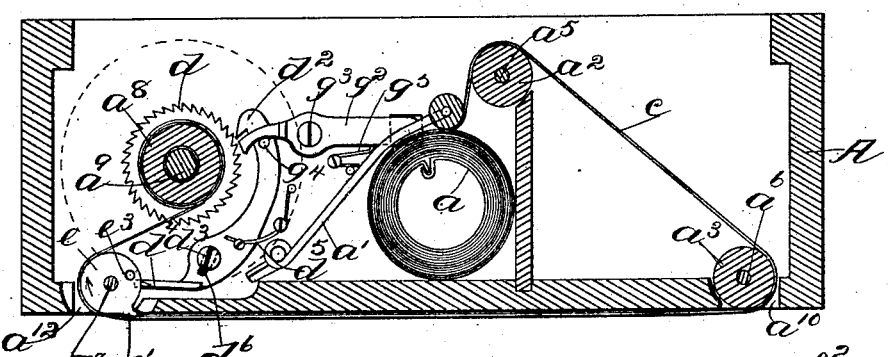
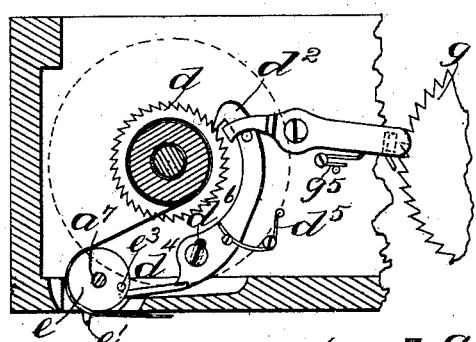
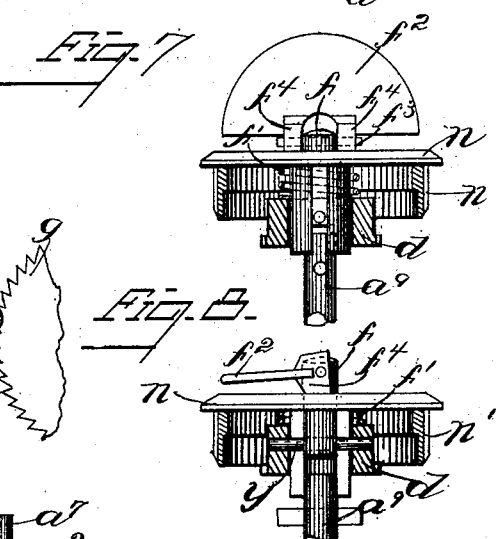
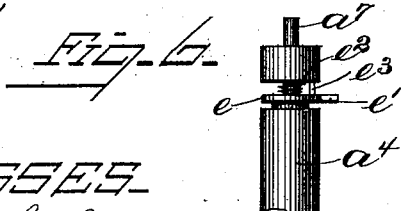
WITNESSES
Florence H. Davis
Charles B. Crocker
INVENTOR
Newton Crane
by B. Johnson
atty.

UNITED STATES PATENT OFFICE.

NEWTON CRANE, OF NEWTON, MASSACHUSETTS, ASSIGNOR TO DARIUS L. GOFF, OF PAWTUCKET, RHODE ISLAND.

PHOTOGRAPHIC ROLL-HOLDER.

SPECIFICATION forming part of Letters Patent No. 549,231, dated November 5, 1895.

Application filed January 14, 1895. Serial No. 534,749. (No model.)

*To all whom it may concern:*

Be it known that I, NEWTON CRANE, of Newton, county of Middlesex, State of Massachusetts, have invented an Improvement in Film-Holders for Photographic Cameras, of which the following description, in connection with the accompanying drawings, is a specification, like letters and numerals on the drawings representing like parts.

This invention relates to roll-film holders for photographic cameras, wherein the film in strip form is drawn from a roll over a flat or other surface for the exposure and then wound upon another roll; and the invention has for its object to provide improved means for indicating the points between successive exposures in order that the film may be severed in the dark-room; and also to provide improved means for positively indicating when the film has been moved along a given distance sufficient for a new exposure; and also to provide improved means for operating the indicating device by which the number of exposures is visually indicated.

In carrying out one part of my invention I provide the film with a series of holes, slits, or perforations, made at regular intervals along the strip, by which the user can tell, by feeling, where to cut the film. These holes, slits, or perforations may be made in the film before it is placed in the holder.

In carrying out another, and the most essential part of my invention, I provide suitable stopping mechanism by which the progress or movement of the film is arrested at each time it is moved along a given distance, sufficient for a new exposure, and suitable releasing mechanism is provided for said stopping mechanism. As a simple and practical way of carrying out this part of my invention, the stopping mechanism is constructed and arranged to act upon the winding-roll, being operated by a suitable actuator or actuating device controlled by a flexible strip—as, for instance, it may be the film—and said actuator may have a detent which enters one or another hole in the flexible strip, and as said strip is moved along the actuator is in turn moved and caused to operate the stopping mechanism and thereby arrest the movement of the winding-roll. To release the roll when so arrested the co-operative parts of the stopping mechanism are separated by a device adapted to be manipulated by the user, and for convenience this device may be and is herein represented as a finger-piece by which the winding-roll is turned.

My invention also comprehends a visual indicating device which shows the number of exposures and actuating mechanism therefor, the operation of which is controlled by a detent which co-operates with the perforated flexible strip.

Figure 2:
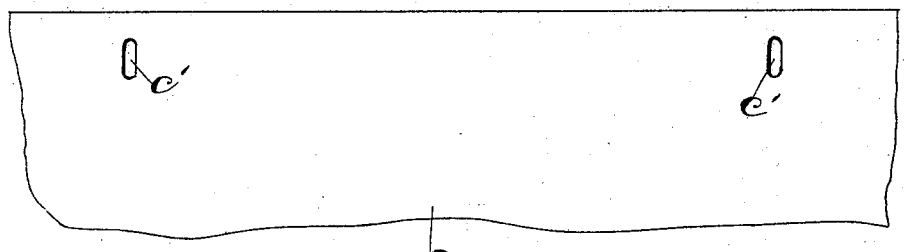

Figure 1 represents a rear side view of the roll-film holder of photographic cameras embodying this invention, the back plate and film being removed; Fig. 2, a detail showing a portion of the film; Fig. 3, a top view of the holder; Fig. 4, a cross-section of the holder shown in Fig. 1, taken on the dotted line $xx$, the film being shown in position; Fig. 5, a cross-sectional detail similar to Fig. 4, showing the stopping mechanism and actuating device therefor in their abnormal positions, whereby the winding-roll is arrested; Fig. 6, a detail of the actuating device; Fig. 7, a vertical sectional detail of the releasing mechanism for the stopping mechanism; Fig. 8, a sectional detail similar to Fig. 7, the releasing mechanism being in position to release the stopping mechanism; Fig. 9, a detail of one end bearing for the detachable shaft or spindle of the winding-roll.

The box A, of rectangular or other shape, is used as the film-holder and contains within it the film-roll $a$, which is held in position by a suitable spring-clamp $a'$, also idle-rolls $a^2$ $a^3$ $a^4$, secured, respectively, to or mounted upon shafts $a^5$ $a^6$ $a^7$, and also the winding-roll $a^8$ on shaft $a^9$, the shafts of said rolls having their bearings in the side walls of the box or case, with the exception of the shaft $a^9$. The shaft $a^9$ has connected to it at one end several parts, to be hereinafter described, and at its other end is provided with a circumferential groove 50, (see detail, Fig. 9,) and a flat plate 51 is pivoted to the wall of the box, having at its inner end a notched part which enters the circumferential groove 50, while the opposite end of said plate projects outwardly through a hole in the box, so as to be accessible to the operator. This plate serves as one end bearing for the shaft or spindle $a^9$, and when it is desired to remove the shaft for the removal of the negative-roll said plate is turned on its pivot.

The box A has at one side two slots or openings $a^{10}$ $a^{12}$, one at each end, and the film $c$ from the film-roll $a$ passes out through the slot $a^{10}$ and in through the slot $a^{12}$ to be wound upon the winding-roll.

The rolls $a^3$ $a^4$ are journaled so as to turn in or adjacent to the slots, and serve as supports for the ends of the exposed portion $b$ of the film $c$.

The film in strip form is wound on the roll $a$, and is provided at regular intervals with slits, holes, or perforations $c'$, said holes enabling the user, in the dark, to determine where to sever the film. These holes are preferably made previous to depositing the film-roll in the holder.

For the purpose of indicating to the user when a sufficient amount of film has been moved along for a new exposure—as, for instance, a portion of film equal to the distance between the rolls $a^3$ $a^4$—I have provided stopping mechanism which arrests the movement of the film.

While many forms or constructions of stopping mechanisms or devices may be made to accomplish this result, and which come within the spirit and scope of this invention, the form herein shown is simple and efficient. It consists of a ratchet-wheel $d$, placed on the winding-roll $a^9$, which, for purposes to be hereinafter described, is adapted to slide longitudinally on as well as turn with said roll, a pawl $d^2$, pivoted at $d^3$, and having an extended lower or tail-piece $d^4$, which is adapted to be engaged by a suitable actuator or actuating device to throw the pawl into engagement with the ratchet-wheel $d$, and thereby arrest the movement of the winding-roll. The pawl $d^2$ is acted upon by a spring $d^5$, the tendency of which is to restore it to its normal position out of engagement with the ratchet-wheel, as represented in Fig. 4. The pawl $d^2$ has a slot $d^6$ for its pivot-pin $d^3$, which enables the pawl to be drawn upward or advanced a short distance by the ratchet-wheel $d$, when the pawl is moved into engagement with the moving ratchet-wheel. The idle-roll $a^4$ is cut away at $a^{50}$, and receives upon its shaft $a^7$ a disk $e$, (see Figs. 4, 5, and 6,) said disk being of substantially the same diameter as the roll $a^4$, and having projecting from its periphery a detent $e'$, which is adapted to enter any one of the holes in a flexible strip, which may be the film. The disk $e$ is mounted loosely upon the shaft $a^7$, and a spring $e^2$ encircles the shaft, bearing firmly against the disk, holding it frictionally against the roll, so that the tendency of the disk is to revolve with the roll $a^4$. The disk $e$ has also a pin $e^3$, projecting from one side, adjacent to the tail-piece $d^4$ of the pawl $d^2$, so that when the disk is turned the pin $e^3$ will engage the tailpiece $d^4$, and by depressing it throw the pawl $d^2$ into engagement with the ratchet-wheel.

With the parts in their normal position, as shown in Fig. 4, the roll $a^4$ is rotating in the direction of the arrow, and the detent $e'$ of the disk $e$ bears gently against the inner face of the film, being thereby restrained from rotation, and at such time the pin $e^3$ is just above and about to engage the tail-piece $d^4$. The disk continues to occupy this position until one of the holes or slits $c'$ in the strip $c$ comes beneath the detent $e'$, when the detent at once enters the hole, and by the continued rotation of the roll and onward movement of the strip as it is being wound upon the wind-roll $a^8$ the disk $e$ is turned until its pin $e^3$ depresses the tailpiece $d^4$, throwing the pawl $d^2$ into engagement with the ratchet-wheel $d$, and thereby arresting the movement of the winding-roll. Further progress of the film is thereby arrested. At such time the next hole $c'$ in the strip $c$ is beneath or in front of the roll $a^3$. As soon as the pawl engages the rachet-wheel, further movement of the ratchet-wheel is yet permitted by reason of the slot $d^6$, so that the pawl is drawn up or advanced a short distance, in order that the tailpiece $d^4$ may be moved out of the path of the pin $e^3$, to enable the disk $e$ to complete its rotation with the roll $a^4$ as soon as the pawl is disengaged from the ratchet-wheel.

As a releasing device for the stopping mechanism thus described, I have herein shown the rachet-wheel $d$ as secured to a stud $f$ by pin 5, said stud moving in a socket formed at the end of the winding-roll, and a spring $f'$ encircles the shaft of the winding-roll, the tendency of which is to press the ratchet-wheel $d$ inwardly. A finger-piece $f^2$ is pivotally connected to the stud $f$ by a pin $f^3$, passing through ears $f^4$, formed on the finger-piece and through the stud. The ears $f^4$ are made angular in shape, as represented in Fig. 9, or otherwise cam-shaped, and bear upon the face of the disk $n$, so that by turning the finger-piece $f^2$ down upon the disk $n$, or toward the end of the winding-roll, the stud $f$ will be withdrawn, thereby drawing the ratchet-wheel $d$ toward the end of the winding-roll, and when so drawn out it is moved out of engagement with the pawl $d^2$, permitting the latter by reason of its spring $d^5$ to resume its normal position. Thus the releasing mechanism comprises, essentially, a co-operative part of the stopping mechanism—as the ratchet-wheel, for instance—and means for moving it out of co-operative relation or engagement with the other parts.

The disk $n$ has an annular ratchet-toothed rim $n'$ engaged by back-stop pawl $n^2$, to prevent retrograde movement of the winding-roll.

The indicating-wheel $g$, to indicate the number of exposures, is shown as a ratchet-toothed wheel freely revoluble upon a stud $g'$, and a lever $g^2$ is pivoted at $g^3$, one end of which carries a pawl $g^4$, which engages the teeth of the ratchet-wheel $g$, and the other end extends over or by a pin $d^4$ on the pawl $d^2$, and each time the pawl $d^2$ is thrown into engagement with the ratchet-wheel $d$ and drawn up or advanced said lever $g^2$ is moved to move the rachet-toothed wheel $g$ one step. The lever $g^2$ is restored by the spring $g^5$. The indicating-wheel $g$ has a back-stop pawl $g^{20}$, which prevents retrograde motion. Thus it will be seen that the indicating-wheel is advanced by turning the ratchet-wheel $d$, but the engagement of the parts by means of which the indicating-wheel is advanced is controlled by the detent $e'$ and perforated strip $c$.

In operating the apparatus it will be seen that by turning the finger-piece $f^2$ the strip will be wound off the film-roll onto the winding-roll until said roll is arrested by the stopping mechanism. Then by turning down said finger-piece the stopping mechanism is released or set free; and furthermore, as herein shown, the indicating-wheel is also operated by said finger-piece, and when it is desired to remove the roll of film the shaft is detached by the same finger-piece.

I claim—

1. In a roll film holder for photographic cameras, a film roll, and winding roll, stopping mechanism for arresting the movement of the film, and an actuating device therefor, comprising a detent adapted to enter holes made in said film at regular intervals, and to be moved at such time with the film.

2. In a roll film holder for photographic cameras, a film roll, and winding roll, supports for the film at each end of the exposed portion, stopping mechanism for arresting the progress of the film at each time a sufficient amount has been moved along for a new exposure, and an actuating device for said stopping mechanism comprising a detent adapted to enter holes made in the film at regular intervals, and to be moved at such time with said film.

3. In a roll film holder for photographic cameras, a film roll, and winding roll, supports for the film at each end of the exposed portion, a finger piece for turning the winding roll, stopping mechanism for the winding roll, an actuating device therefor, adapted to operate it and stop the winding roll at each time a sufficient amount of film has been moved along for a new exposure, a releasing device for said stopping mechanism comprising a sliding piece operated by said finger piece and connected with a cooperative part of the stopping mechanism.

4. In a roll film holder for photographic cameras, a film roll, and winding roll, stopping mechanism for arresting the movement of the film, comprising a ratchet wheel on the winding shaft, a pawl, normally disengaged therefrom, and an actuating device for throwing the pawl into engagement with the ratchet wheel each time a sufficient amount of film has been moved along for a new exposure, and releasing mechanism for said stopping mechanism, comprising a sliding stud connected with said ratchet wheel, and means for moving it to disengage the ratchet wheel from the pawl.

5. In a roll film holder for photographic cameras, a film roll, and winding roll, a finger piece for turning it, automatically operated stopping mechanism for said winding roll, which arrests its movement each time a sufficient amount of film has been moved along for a new exposure, and a releasing device for said stopping mechanism operated by the finger piece employed for turning the winding roll.

6. In a roll film holder for photographic cameras, the combination of a film roll, and winding roll, and supports for each end of the exposed portion of the film, a ratchet wheel on the winding shaft, pawl $d^2$ normally disengaging it, spring pressed detent $e'$ bearing against the inner face of the film, and by entering holes therein to be moved as the film is wound, and a pin $e^3$ moved by said detent to throw the pawl $d^2$ into engagement with the ratchet wheel.

7. In a roll film holder for photographic cameras, the combination of a film roll, and winding roll, and supports for each end of the exposed portion of the film, a ratchet wheel on the winding shaft, pawl $d^2$ normally disengaging it, having a slot for the pivot pin, a rotatable spring pressed detent $e'$ bearing against the inner face of the film, and by entering holes therein to be moved as the film is wound, and a pin $e^3$ moved by said detent to throw the pawl $d^2$ into engagement with the ratchet wheel.

8. In a roll film holder for photographic cameras, the combination of a film roll, a winding roll, and supports for each end of the exposed portion of the film, ratchet wheel on the winding roll, pawl $d^2$ normally disengaging it, and having a slot for its pivot pin, means for moving said pawl into engagement with the ratchet wheel at each time a sufficient amount of film has been moved along for a new exposure, a pivoted lever engaged by said pawl $d^2$ and carrying the pawl $g^4$, and the ratchet toothed indicating wheel $g$.

9. In a roll film holder for photographic cameras, the combination of the film roll, and winding roll, ratchet wheel sliding on and turning with said winding roll, pawl $d^2$ normally disengaged therefrom, and means for throwing said pawl into engagement with said ratchet wheel to arrest the movement of the winding roll at each time a sufficient amount of film has been moved along for a new exposure, stud $f$ connected with said ratchet wheel, and pivoted finger piece connected with said stud having cam portions $f^4$.

10. In a photographic camera, a film roll and a winding roll, an indicating device, and an actuating device therefor comprising a detent adapted to enter holes made in said film at regular intervals and to be moved at such time with the film, substantially as described.

11. In a roll film holder for photographic cameras, a film roll, and winding roll, a finger piece for turning it, an indicating wheel, actuating mechanism therefor, a cooperative part of which is moved into engagement when a sufficient amount of film has been moved along for a new exposure, and moved out of engagement by said finger piece.

12. In a photographic camera, a film roll and a winding roll, supports for the film at each end of the exposed portion, an indicating device which indicates when a sufficient amount of film has been moved along for a new exposure, and an actuating device for said indicating device comprising a detent adapted to enter holes made in the film at regular intervals, and to be moved at such time with said film, substantially as described.

13. In a roll film holder for photographic cameras, an indicating wheel which shows the number of exposures, actuating pawl therefor, pawl $d^2$, ratchet wheel $d$, means for moving the pawl $d^2$ into engagement with said ratchet wheel, operated by the perforated film, and means for turning said ratchet wheel and thereby in turn operating the pawl which advances the indicating wheel, substantially as described.

14. In a roll film holder for photographic cameras, the detachable shaft $a^9$, stop wheel $d$ thereon, and finger piece connected with said detachable spindle for turning and detaching it, substantially as described.

15. In a roll film holder for photographic cameras, a finger piece connected with and adapted to turn the winding roll, also connected with a cooperative part of the stopping mechanism for said winding roll, and adapted to be manipulated to release said stopping mechanism, substantially as described.

16. In a roll film holder for photographic cameras, a finger piece connected with and adapted to turn the winding roll, and also connected with and adapted to advance the indicating wheel, substantially as described.

In testimony whereof I have signed my name to this specification in the presence of two subscribing witnesses.

NEWTON CRANE.

Witnesses:
B. J. NOYES,
C. B. CROCKER.